(12) United States Patent
Brady et al.

(10) Patent No.: US 6,867,532 B2
(45) Date of Patent: Mar. 15, 2005

(54) LONG LIFE PIEZOELECTRIC DRIVE AND COMPONENTS

(75) Inventors: Kevin Brady, Oshawa (CA); Dmytro Vyshnevskyi, Toronto (CA); Gyula Hamberger, Courtice (CA); Brendon Nunes, Ajax (CA)

(73) Assignees: The Brady Group Inc., Ontario (CA); Trintec Industries, Inc., Ontario (CA)

( * ) Notice: Subject to any disclaimer, the term of this patent is extended or adjusted under 35 U.S.C. 154(b) by 52 days.

(21) Appl. No.: 10/620,366

(22) Filed: Jul. 17, 2003

(65) Prior Publication Data

US 2005/0012433 A1 Jan. 20, 2005

(51) Int. Cl.⁷ ............................................... H01L 41/08
(52) U.S. Cl. ................................................. 310/323.02
(58) Field of Search .................................. 310/323.02

(56) References Cited

U.S. PATENT DOCUMENTS

| | | | |
|---|---|---|---|
| 4,019,073 A | * 4/1977 | Vishnevsky et al. | ........ 310/322 |
| 4,400,641 A | * 8/1983 | Vishnevsky et al. | ... 310/323.02 |
| 4,453,103 A | 6/1984 | Vishnevsky et al. | |
| 4,651,310 A | 3/1987 | Kaneko et al. | |
| 4,670,074 A | 6/1987 | Broussoux et al. | |
| 4,884,002 A | * 11/1989 | Eusemann et al. | ..... 310/323.02 |
| 4,917,810 A | 4/1990 | Tsunooka et al. | |
| 4,959,580 A | 9/1990 | Vishnevsky et al. | |
| 5,352,950 A | 10/1994 | Shirasaki | |
| 6,469,420 B2 | 10/2002 | Iarochenko et al. | |
| 6,479,922 B2 | 11/2002 | Iarochenko et al. | |
| 6,502,338 B1 | 1/2003 | Marshall | |

FOREIGN PATENT DOCUMENTS

EP 0 932 208 A1 7/1999
JP 04042787 A 2/1992

OTHER PUBLICATIONS

Description of IXEF polyarylamide resin, admitted prior art, www.solvayadvancedpolymers.com.

Description of polyarylamide, admitted prior art, www.a-zom.com.

Online Material Data Sheets for IXEF1032 & 1022, admitted prior art, www.matweb.com.

* cited by examiner

*Primary Examiner*—Mark Budd
(74) *Attorney, Agent, or Firm*—Nixon & Vanderhye P.C.

(57) ABSTRACT

A piezoelectric drive, and the rotor and/or pushers thereof, have long life, e.g. at least about 6000 hours of actual operation. The piezoelectric drive also is highly accurate, and is relatively inexpensive to make. The rotor friction surface and/or pushers are made from a material having a low mechanical quality factor, yet with high strength and stability under the conditions encountered in the ultrasonic fields typical of piezoelectric drives. The material is preferably a semi-crystalline thermoplastic polymer (e.g. polyarylamide) with filler (e.g. glass particles or fiberglass), e.g. about 30–60% polymer and about 40–70% filler, and can easily make injection molded components or parts or components. A pair of drives may be connected together to form an instrument, for example rotating a shaft connected to a pointer of analog instrument either clockwise or counterclockwise. Analog instruments, such as thermometers, barometers, speedometers, altimeters, pH meters, anemometers, etc., or other precision devices may utilize the piezoelectric drive. Alternatively, the piezoelectric drive may drive other mechanical devices such as gears, encoding locks, servo systems, point of purchase devices, micro pumps, clocks, timers, etc.

28 Claims, 9 Drawing Sheets

LONG LIFE PIEZOELECTRIC DRIVE AND COMPONENTS

The invention relates to a piezoelectric drive (also sometimes referred to as a piezoelectric motor) having components, including a rotor and/or pushers, which give it long life and a number of other advantages compared to conventional piezoelectric drives. The piezoelectric drive according to the invention is suitable for use in the construction of analog instruments, as well as for driving a wide variety of other devices including (without limitation) gears, point of purchase displays, encoding locks, and micropumps, and the invention also encompasses unique instruments and devices per se.

BACKGROUND AND SUMMARY OF THE INVENTION

One of the most basic aspects of the present invention relates to a piezoelectric drive of the general type such as shown in U.S. Pat. Nos. 4,400,641, 4,453,103, 4,959,580 and 6,469,420 (the disclosures of which are hereby incorporated by reference herein). Such drives have a rotor, stator, a piezoelectric oscillator, and elastic pushers acting between the rotor and oscillator to move the rotor. The invention also relates to component parts, particularly rotors and/or pushers, of such piezoelectric drives, and the use of such drives in the construction of analog instruments, and in the construction of a wide variety of other mechanical devices apart from analog instruments.

The piezoelectric drives of the above-identified patents effect rotation of the rotors by generation of longitudinal ultrasonic fluctuations in the elastic pushers. As a result of these fluctuations, the ends of the pushers are pressed onto the rotor's friction surface, and the rotor and pushers are caused to rotate with respect to each other.

Conventional rotor friction surfaces are made of hard materials that are capable of resisting the influence of the powerful ultrasonic field created at the rotor-engaging end of each pusher. Typical materials are steel, aluminum oxide, and zirconium oxide. However, such conventional hard materials used for rotors, especially when used with steel pushers, are very abrasive. The abrasive action between the pushers and rotors causes rapid wear of the rotor and pusher materials, fine particles of the rotor and pushers breaking off. When the broken-off steel particles are exposed to air they typically oxidize, e.g. turning into a hard abrasive powder of iron oxide. This means that conventional piezoelectric drives have an effective life of only about 100–1000 hours of actual operation, too short for many applications (including, but not limited to, analog instruments).

The fine particles of iron oxide cause other problems. They stick to the working surface of the rotor, and penetrate it. The combination of wear and penetration causes a non-uniform rotor surface, resulting in an inexact degree of rotation of the rotor for each actuation of the piezoelectric oscillator. This limits applicability of conventional piezoelectric drives in applications (including, but not limited to, analog instruments and servo systems) where drive precision is necessary.

Yet another weakness inherent in rotors made from materials like steel, aluminum oxide, and zirconium oxide, is their high mechanical quality factor. Every resonance system has its own mechanical quality factor, represented by the formula $Q=Fr/(F2-F1)$. Fr is the frequency of the system at maximum resonant amplitude, and F1 and F2 are the frequencies before and after the maximum resonant amplitude, respectively, at the positions defined by the maximum amplitude divided by the square root of two. The value of Q for steel is about 2000, and for conventional piezoelectric ceramics about 1000. Such a high Q contributes to the creation of parasitic ultrasonic fluctuations, which in turn lead to the dampening of energy transmitted by the pushers to the rotors, reducing the overall performance of the drive. In addition, materials with a high Q factor typically require a significant amount of precision machining, and therefore are costly, especially when compared with injection molded parts.

The use of hard wear-resistant plastic materials, such as a paper-based laminate, for the outer ring of a rotor or for pushers (see U.S. Pat. No. 4,453,103, col. 10, lines 18–20 and col. 12, lines 25–30) does not solve all of the problems set forth above, or have all of the advantages of the invention. Also, the use of a material with a low Q factor, per se, such as conventional amorphous thermoplastic polymers, also causes significant problems. The use of amorphous thermoplastics such as poliatsetals and polystyrenes with firm filler materials with similar properties, in the construction of rotors is typically unsuccessful. These materials have insufficient thermal stability at the frictional surface of the rotor, and start to melt or lose strength when exposed to the powerful ultrasonic fields typically created in piezoelectric drives. Therefore they too have short lives, and introduce inaccuracies into incremental movements over time.

EPO Patent Application 0 932 208 A1 proposes making a piezoelectric motor with an injection molded rotor of semi-crystalline thermoplastic polymer with filler, and a stator and holder of polyamide with a 20–30% glass fiber content and also injection molded. The material of the plates ("Lamellen") 3 does not appears to be specified, but the plates are apparently shown integral with the oscillator 2, and the oscillator is of piezo-ceramic material. The preferred polymeric material for the rotor is polyarylamide; although the amount of filler is not specified, the properties of the rotor material set forth correspond to a commercial polyarylamide with about 60% filler. While the rotor of the EPO reference is likely to be highly advantageous, any advantages associated with the plates 3 are speculative at best, and if the plates are of piezo-ceramic material that would be a drawback for long life applications that are encompassed according to some aspects of the present invention. Also, there may be some circumstances where it is desirable to make only the friction surface of the rotor of semi-crystalline thermoplastic polymer with filler, rather than make the entire rotor of that material as an integral injection molded part as is required in the EPO publication.

According to one aspect of the present invention, a piezoelectric drive, and its components (particularly rotors and/or pushers thereof), are provided that overcome the problems inherent in the conventional prior art discussed above, and can be advantageous compared to the structure of the EPO reference. The piezoelectric drives, and components, according to the invention have significantly reduced wear of the pushers and rotors, resulting in longer life. For example, a piezoelectric drive according to the invention having a rotor according to the invention can be expected to have an effective life of over about 6000 hours of actual operation, e.g. about 7000 hours. If pushers according to the invention are also employed, the effective life can be expected to be over about 9000 hours of actual operation, e.g. about 10,000 hours.

In addition to longer life, the piezoelectric drives, and components, according to the invention have a more uniform and stable rotation of the rotor (all other factors being equal), resulting in higher accuracy of positioning. This thus expands the market for piezoelectric drives to precision devices (including, but not limited to, analog instruments, and servo systems). Also, according to the invention, the above advantages are achieved while simultaneously reducing the cost of manufacture of piezoelectric drives using steel or ceramic rotors and pushers.

The advantages of one aspect of the invention are basically accomplished by using as the rotor friction surface material, and also the material for the pushers, one that has a low mechanical quality factor (e.g. Q is less than about 500, typically less than about 200, preferably less than about 100, and most preferably about 30–50). Yet the material has high strength, reduced hardness (compared to steel and ceramics), and is able to withstand the strong ultrasonic fields of piezoelectric devices without melting or losing a significant amount of strength. For example, the strength of the material [expressed as ultimate tensile strength, although other measures of strength may be employed] is preferably at least about 140 MPa (more desirably at least about 205 MPa, and most desirably at least about 225 MPa).

One highly desirable class of materials for use as the rotors (whether just simply the friction surface thereof, or the entire rotor body injection molded in one piece) and pushers according to the invention comprises semi-crystalline thermoplastic polymer with filler. While a number of such polymers may be suitable (e.g. polyphenylene sulfide, nylon 6,6, or subsequently developed or modified polymers), the presently preferred polymer is polyarylamide. This polymer has a glass transition temperature of about 85 degrees C. (and therefore remarkable rigidity for a polymeric material). It also has high strength (e.g. with about 50% filler about 255 MPa ultimate tensile strength—higher than that of many metals—and about 380 MPa flexural yield strength), low creep, an excellent surface finish, and a Q factor of about 30–50. Components, or parts of final components (such as the friction surface of a rotor), made from polyarylamide are readily produced by injection molding, making them relatively inexpensive as well as mechanically desirable.

According to one aspect of the present invention there is provided an elastic pusher for a piezoelectric drive, comprising: an elastic pusher body comprising, or consisting essentially of, semi-crystalline thermoplastic polymer and filler, which does not lose a significant amount of strength or start to melt when exposed to ultrasonic fields typically used in piezoelectric drives, the body configured and dimensioned to cooperate with a stator, rotor, and piezoelectric oscillator in a piezoelectric drive. For example, the pusher body may consist essentially of about 30–60% (preferably about 40–50%) by weight semi-crystalline thermoplastic polymer (e.g. polyarylamide) and about 40–70% (preferably about 50–60%) by weight filler. The pusher may be integral with a ring and a plurality of other pushers (all extending radially from the ring) of the same material. The ring is dimensioned and configured to fit on a piezoelectric oscillator. The ring may be press fit onto, adhesively attached to, or molded onto, the piezoelectric oscillator.

If desired, the pusher body may comprise a plurality of plates connected together, at least some of the plates having oriented fibers in the dimension of elongation thereof. The multi-plate pusher may be connected to a holder along with a plurality of like pushers, by crimping, adhesive, soldering, welding, etc.

Most desirably, the pusher body is injection molded and elongated in a dimension, and comprises a polymer, and at least 10% by weight fibers substantially oriented in the dimension of elongation of the pusher body (as well as possibly other filler), e.g. up to 60% of the pusher weight could be oriented fibers. The pusher body material also preferably has an ultimate tensile strength of at least about 140 MPa (more desirably at least about 205 MPa, and most desirably at least about 225 MPa). Also, the elastic pusher preferably has an effective life of at least about 9000 hours (e.g. about 10,000 hours) of operation in a piezoelectric drive when cooperating with a rotor body having a friction surface also of semi-crystalline thermoplastic polymer and filler which does not lose a significant amount of strength or start to melt when exposed to ultrasonic fields typically used in piezoelectric drives. The preferred thermoplastic polymer is polyarylamide, and the filler may be selected from the group consisting primarily of particles of glass, fiberglass, particles or fibers of oxide ceramics, metals, carbon, or graphite, and combinations thereof.

According to another aspect of the present invention there is provided a rotor for a piezoelectric drive, comprising: a rotor body having a friction surface of semi-crystalline thermoplastic polymer and filler, which does not lose a significant amount of strength or start to melt when exposed to ultrasonic fields typically used in piezoelectric drives, the body and friction surface thereof configured and dimensioned to cooperate with a stator, pushers, and piezoelectric oscillator in a piezoelectric drive, with the pushers operatively engaging the friction surface of the rotor. While for some purposes the body may be essentially one piece, e.g. injection molded of a semi-crystalline thermoplastic polymer and filler, typically the friction surface can be formed of a different material than the rest of the body. For example, the friction surface can be injection molded as a ring (e.g. of about 45% polyarylamide and 55% filler) which is fit onto or into and attached to a core element to form the body. The core element may be of a cheaper material (e.g. cheaper plastic, such as polyamide) than polyarylamide, and may also be injection molded. The ring may be press fit onto, adhesively attached to, welded to, and/or otherwise attached to the core element.

Instead of being of necessarily cheaper material, the core element of the rotor may be of metal (such as a molded aluminum alloy), or other material that is an excellent conductor of heat. In this way the core element of the rotor may provide a heat sink for the often high heat levels created by the interaction of the rotor friction surface and pusher ends during operation of the piezoelectric drive.

Regardless of the material of the core element, the friction material ring of the rotor may be located in a wide variety of positions with respect to the core element, including as an interior surface, or exterior surface.

The body friction surface may comprise or consist essentially of semi-crystalline thermoplastic polymer and filler. For example, the body friction surface may consist essentially of about 30–60% (preferably about 40–50%) by weight semi-crystalline thermoplastic polymer and about 40–70% (preferably about 50–60%) by weight filler. For example, the body, or the friction surface of the body as a ring, may be injection molded, and the semi-crystalline thermoplastic polymer may comprise polyarylamide, and the filler may be selected from the group consisting primarily particles of glass, fiberglass, particles or fibers of oxide ceramics, metals, carbon, or graphite, and combinations thereof. The rotor body friction surface may have an ultimate tensile strength of at least about 140 MPa (preferably at least about 205 MPa, e. g. at least about 225 MPa), and the rotor preferably has an effective life of at least about 6000 hours of operation in a piezoelectric drive.

The invention also encompasses a piezoelectric drive comprising: A first stator. A first piezoelectric oscillator. A first rotor with a friction surface of semi-crystalline thermoplastic polymer with filler, which does not lose a significant amount of strength or start to melt when exposed to ultrasonic fields typically used in piezoelectric drives. A driven element (typically a shaft) operatively connected to the first rotor. And a plurality of elastic pushers cooperating between the first rotor friction surface and first oscillator, to move the rotor in a first direction with respect to the stator upon actuation of the piezoelectric oscillator, the pushers comprising semi-crystalline thermoplastic polymer with filler, which does not lose a significant amount of strength or start to melt when exposed to ultrasonic fields typically used in piezoelectric drives.

Preferably, the material of the pushers has a mechanical quality factor of less than about 200 (e.g. about 30–50), and has an ultimate tensile strength of at least about 140 Mpa, e.g. is about 30–60% polyarylamide with about 40–70% filler.

The piezoelectric drive may further comprise: A second piezoelectric oscillator. A second rotor with a friction surface. And a plurality of elastic pushers cooperating between the second rotor and second oscillator; and wherein the second rotor friction surface and the plurality of pushers, comprise semi-crystalline thermoplastic polymer with filler, which does not lose a significant amount of strength or start to melt when exposed to ultrasonic fields typically used in piezoelectric drives. The first and second rotors are operatively connected so that actuation of the first and second piezoelectric oscillators, respectively, moves the driven element (shaft) in opposite first and second directions (e.g. clockwise, and counterclockwise).

In the piezoelectric drive described above, the rotors may be operatively connected to a pointer of an analog instrument, the pointer mounted on the shaft. The drive may then further comprise an angular position sensor which operatively senses the position of the shaft, and an environmental condition sensor operatively connected to the angular position sensor, and operatively connected to the piezoelectric oscillators to control operation thereof to move the pointer in the first or second directions in response to a sensed environmental condition.

Alternatively, the first rotor is operatively connected to a driven mechanical element excluding a pointer (such as a point of purchase display, as in U.S. Pat. No. 6,502,338, or a main component of a servo system). Or, the first rotor may be operatively connected to a time measuring hand.

Also, the first rotor may be injection molded (completely, or just the friction surface thereof) of about 30–60% by weight semi-crystalline thermoplastic polymer (e.g. polyarylamide) and about 40–70% by weight filler (e.g. selected from the group consisting primarily of glass particles, fiberglass, and particles or fibers of oxide ceramics, metals, carbon, or graphite, and combinations thereof).

According to still another aspect of the invention, there is provided an instrument comprising: a piezoelectric drive comprising: a first stator, a first piezoelectric oscillator, a first rotor, and a first plurality of elastic pushers cooperating between the first rotor and first oscillator; and a second piezoelectric oscillator, a second rotor, and a second plurality of elastic pushers cooperating between the second rotor and second piezoelectric oscillator. A shaft operatively connected to the first and second rotors. Wherein the first and second rotors are operatively connected so that actuation of the first and second piezoelectric oscillators, respectively, moves the shaft in opposite first and second directions. And an environmental condition sensor operatively connected to the piezoelectric oscillators to control operation thereof to move the shaft in the first or second directions in response to a sensed environmental condition.

The instrument preferably comprises an analog instrument (although the shaft may be connected to a conventional device that generates a digital display); and further comprises a pointer mounted to the shaft for movement therewith, and a scale which the pointer moves relative to.

The environmental condition sensor may sense one or more environmental conditions, such as speed, temperature, atmospheric or other pressure, altitude, a concentration of one or more particular agents in a gaseous or liquid medium, wind velocity, solar radiation, weight, radioactive decay, moisture, water depth, pH, salinity etc. The instrument also preferably includes an angular position sensor which operatively senses the position of the shaft; and is also operatively connected to the environmental condition sensor. In the instrument described, the first and second rotor friction surfaces (either the entire rotor, or just the friction surface) and/or the pushers may be injection molded of about 30–60% by weight semi-crystalline thermoplastic polymer, with about 4070% filler, and have an effective life of at least about 6000 hours of operation, preferably at least about 9000 hours of operation if both the pushers and rotor friction surfaces are of the specified material.

It is the primary object of the present invention to provide an improved, long-life, accurate, and relatively inexpensive, piezoelectric drive and components thereof, and instruments or devices made therefrom. This and other objects of the invention will become clear from an inspection of the detailed description of the invention, and from the appended claims.

DETAILED DESCRIPTION OF THE DRAWINGS

Figure 1:
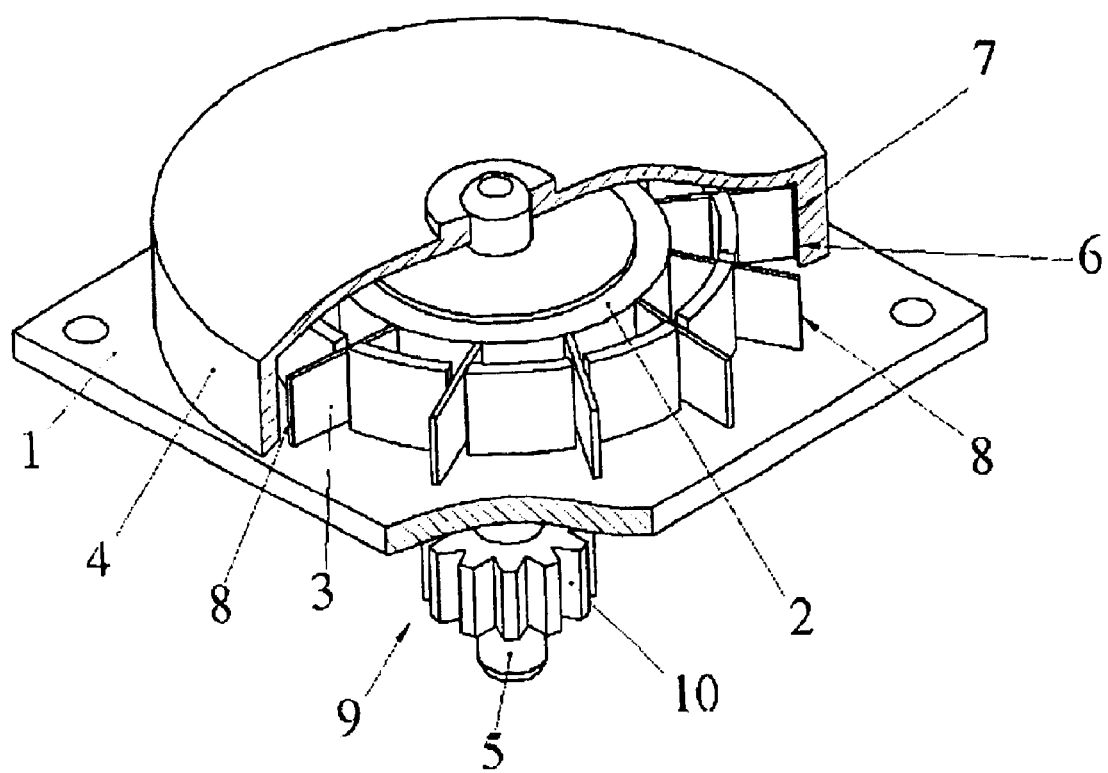
FIG. 1 is a top perspective view, partly in cross-section, of an exemplary embodiment of a unidirectional piezoelectric drive according to the present invention.

An exemplary unidirectional piezoelectric drive according to the present invention is illustrated in FIG. 1. The components include a stator 1, a conventional piezoelectric oscillator 2, a plurality of elastic pushers 3, and a rotor 4. All of these components are known per se in conventional piezoelectric drives. According to the present invention, the material and configuration of the construction of the rotor 4 and/or pushers 3 results in numerous advantages (including long life, enhanced precision, and reduced cost) compared to conventional piezoelectric drives.

In the embodiment illustrated in FIG. 1, the rotor 4 is generally cup-shaped, and is operatively (e.g. rigidly) attached to a shaft 5, which the rotor 4 drives. The inner surface 6 of the rotor comprises a friction surface 7, which surface 7 engages the free, frictional, ends B of the pushers 3. The pushers 3 are operatively connected to the oscillator 2. An executive element, shown generally at 9 in FIG. 1, such as the gear 10, is connected to the shaft 5 and driven therewith.

While the rotor 4 is shown as generally cup shaped with the friction surface 7 thereof radially outward of the pusher ends 8, the rotor 4 can have any desired conventional or subsequently developed configuration. For example, the pusher ends 8 can be radially outward of the rotor frictional surface 7, such as shown (for example) in FIGS. 17 & 24 of U.S. Pat. No. 4,453,103, or the complex configurations illustrated in U.S. Pat. No. 4,400,641 may be used. The rotors may be one-piece, or comprise a core element with the friction surface 7 as a ring (internal, external, or otherwise) press fit, and/or adhesively attached to, and/or welded to the core element. The core element may be of a less expensive material than the friction surface 7, e.g. injection molded of a lower quality and/or less expensive polymeric material than polyarylamide, such as polyamide. Or the core element may be made of a metal (e.g. a molded aluminum alloy) or other material with high heat conductivity, to act as a heat sink.

Figure 2:
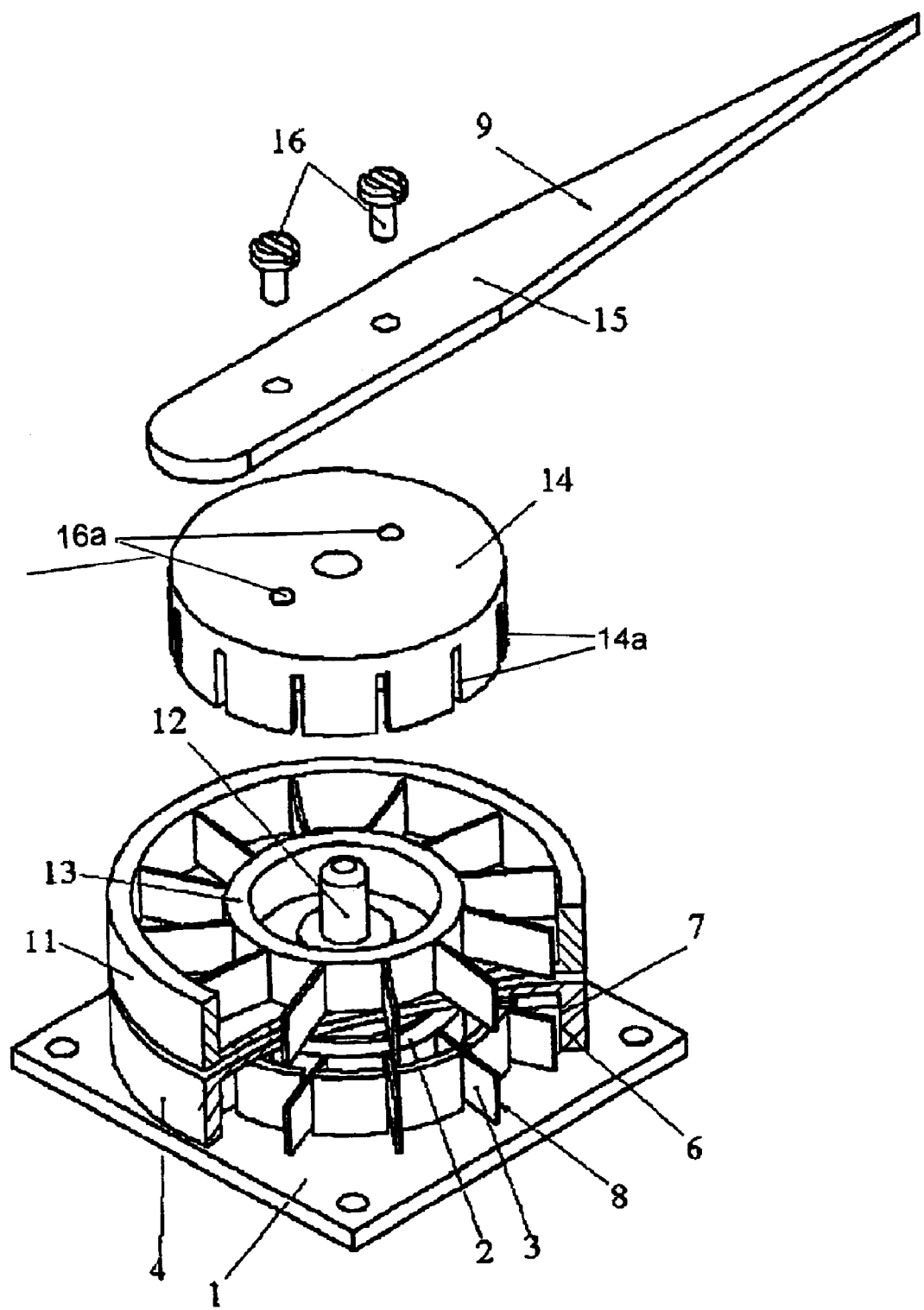
FIG. 2 is top perspective exploded view, partly in cross-section, of an exemplary embodiment of a bidirectional piezoelectric drive, with driven pointer, according to the present invention.

FIG. 2 illustrates a bidirectional embodiment of piezoelectric drive according to the present invention. This includes a second rotor 11 operatively (e.g. rigidly) connected to the first rotor 4, and both rotors 4, 11 connected to a shaft 12 to rotate the shaft 12. A second piezoelectric oscillator 13 is located coaxially with the first oscillator 2. A second set of pushers 3 is operatively connected between the second oscillator 13 and second rotor 11. The free, frictional, ends 8 of both sets of pushers 3 cooperate with their respective friction surfaces 7 of the rotors 4, 11. In the embodiment illustrated a single stator 1 is provided, but in some embodiments different first and second stators could be used.

The oscillator 2 is rigidly connected to the stator 1. When element 2 is energized, it will move the rotor 4 clockwise. Since rotor 4 is rigidly connected to the rotor 11, rotor 11 also will move clockwise. The oscillator 13 is rigidly connected to shaft 12, and because the pushers 3 are jammed on the rotor 13 friction surface 7, the shaft 12 also moves clockwise with respect to the stator 1.

When the oscillator 13 is energized, it moves counterclockwise inside the, rotor 11. Since the rotors 4, 11 are rigidly connected, and the pushers 3 are jammed to the friction surface 7 of the rotor 4, and the element 2 is rigidly connected to the stator 1, the rotors 4, 11 do not move with respect to the stator 1, but the shaft 12 does move counterclockwise with the oscillator 13.

In the FIG. 2 embodiment, a holder 14 operatively engages the second oscillator 13 by receiving the pushers 3 of the second oscillator 13 in radially spaced grooves 14a formed therein. The holder 14 also receives and is operatively connected to the shaft 12 for rotation therewith. Connected to the holder 14 is an executive element, such as the pointer (or hand) 15, such as by screw fasteners 16 passing through openings 16a in the pointer 15 into screw-threaded openings in the holder 14.

Instead of the rotors 4, 11 being rigidly connected together, they may be mounted so that they may rotate in the same direction (e.g. clockwise), and be connected to different pointers 15, e.g. the minute and hour hands of a clock, or the minute and second hands of a timer, etc.

According to the present invention, the materials of which the friction surfaces of the rotor(s) 4, 11 and the pushers 3 are made results in the precision, long-life, relatively low cost, and other advantages according to the invention. While any material that secures these advantages is encompassed within the scope of one aspect of the invention, the preferred material is a semi-crystalline thermoplastic polymer with filler. Such a material is schematically illustrated in FIG. 3 as making up a rotor 4, 11.

Figure 3:
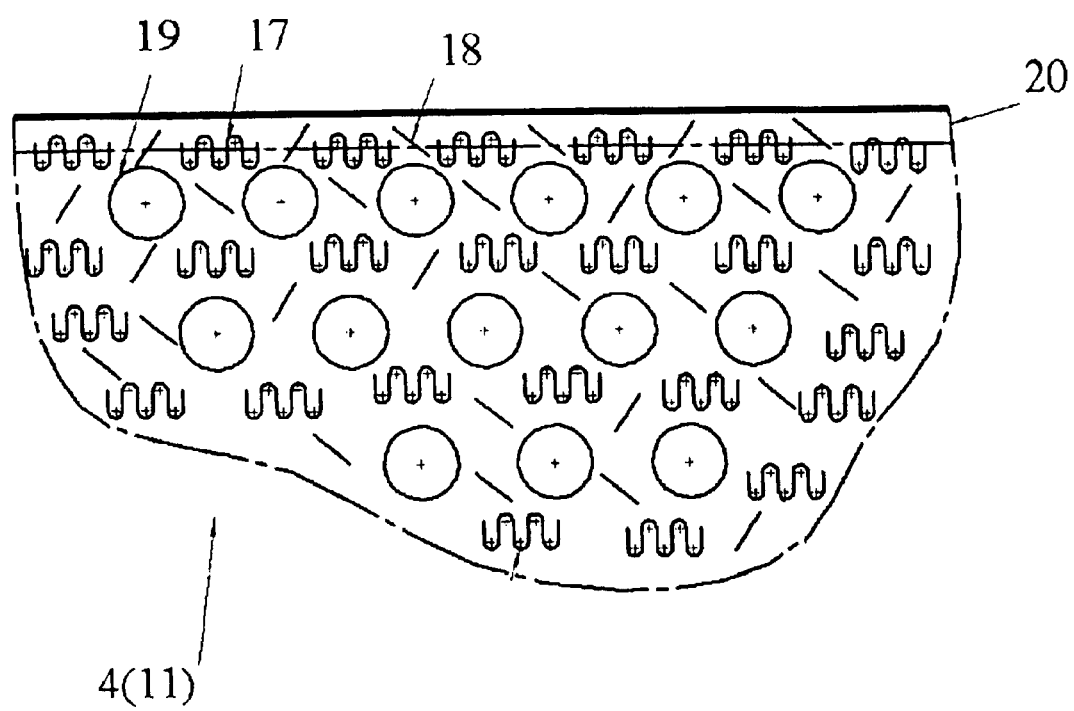
FIG. 3 is a schematic high magnification diagram of the semi-crystalline material used for the rotors of the FIGS. 1 & 2 embodiments.

The material of FIG. 3 is semi-crystalline. This means that it has a crystalline phase, schematically illustrated by the macro molecules 17, and an amorphous phase, schematically illustrated by the macro molecules 18. The material of FIG. 3 also includes a filler, schematically illustrated by the particles or fibers 19. Since the material of FIG. 3 is preferably injection molded, its surface (the outer surfaces of the rotors 4, 11, including or comprising entirely the friction surface 7) is characterized by a depletion layer 20. The layer 20 includes crystallized macro molecules 17 and amorphous macro molecules 18, but essentially no filler 19, and inherently forms during the injection molding process. The depletion layer 20 may have a thickness of up to about 0.1 mm.

The semi-crystalline thermoplastic material and filler in combination form a rotor 4, 11 (or at least the friction surface 7 thereof) which has a low Q factor, less than 500, typically less than about 200, preferably less than about 100, and most preferably between about 30–50. However, the material of the rotor 4, 11 (or at least the friction surface 7) must also have high strength, and its strength must not significantly degrade, nor may it melt, when exposed to the ultrasonic fields typically encountered during use in a piezoelectric drive. While strength may be measured in a number of ways, one typical measurement is ultimate tensile strength. The material of FIG. 3 should have an ultimate tensile strength of at least about 140 MPa, preferably at least about 205, and most preferably at least about 225.

Some semi-crystalline thermoplastic polymers, with appropriate fillers 19, that are suitable as the material 17, 18 include polyphenylene sulfide and nylon 6,6. However, the presently preferred semi-crystalline material is polyarylamide. Polyarylamide with about 50% fiberglass or mineral filler 19 typically has a glass transition temperature of about 85 degrees C., an ultimate tensile strength of about 255 MPa, a tensile modulus of about 20 GPa, and a flexural yield strength of about 380 MPa, and is not significantly affected by the ultrasonic fields typical of piezoelectric drives. Polyarylamide with about 60% fiberglass filler has a tensile strength of about 280 MPa, a tensile modulus of about 23.5 GPa, and a flexural yield strength of about 400 MPa.

Preferably, the polyarylamide is about 30–60% by weight of the rotor 4, 11 (or at least friction surface 7) material, most preferably between about 40–50%, e.

g. about 45%. In that case the filler comprises or consists essentially of about 40–70% by weight, most preferably between about 50–60%, e.g. about 55%. The amount of the crystalline phase 17 compared to the amorphous phase 18 of the thermoplastic polymer may vary significantly. For example, about 40–70% of the polymer may be the crystalline phase 17, and about 30–60% the amorphous phase 18.

There are a wide variety of materials that are useable as the filler 19. Typically conventional glass and/or mineral fillers 19 are utilized, but the filler 19 is not so restricted. Examples of fillers that are suitable include glass particles, fiberglass, both particles and fibers of metals (such as steel), oxide ceramics, carbon, or graphite, and combinations thereof. The size of the particles and/or fibers of the filler 19 is preferably conventional for fillers for polymers like polyarylamide. The filler 19 is added to the polymer 17, 18 using conventional techniques.

In use of the polymeric material, the crystalline phase 17 gives increased temperature stability to the frictional surface 7, and improves resistance thereof to the strong ultrasonic fields at the ends 8 of the pushers 3. The filler 19 makes the rotor 4, 11 (or at least surface 7) more stable, stronger, and temperature-resistant.

Figure 4:
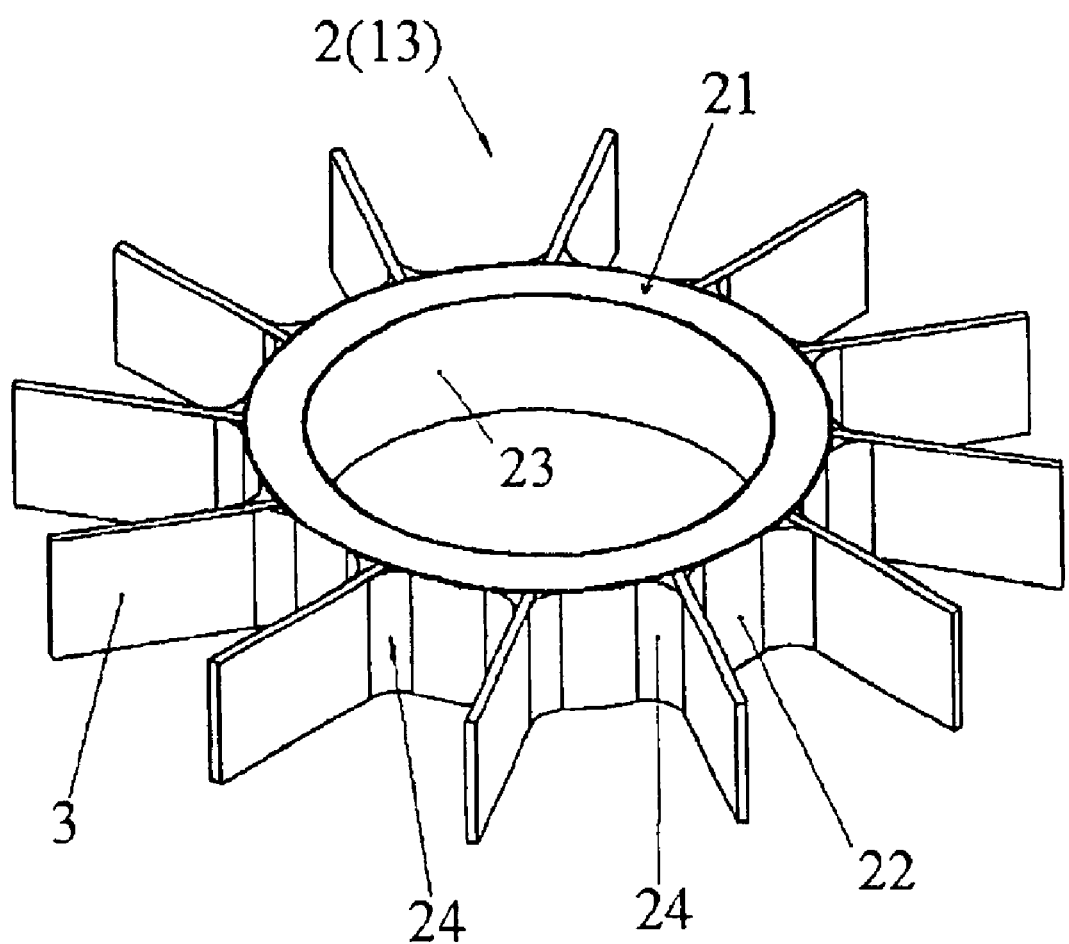
FIG. 4 is a top perspective view of a piezoceramic oscillator utilizable in the drives of FIGS. 1 & 2 with a plurality of elastic pushers.
Figure 5:
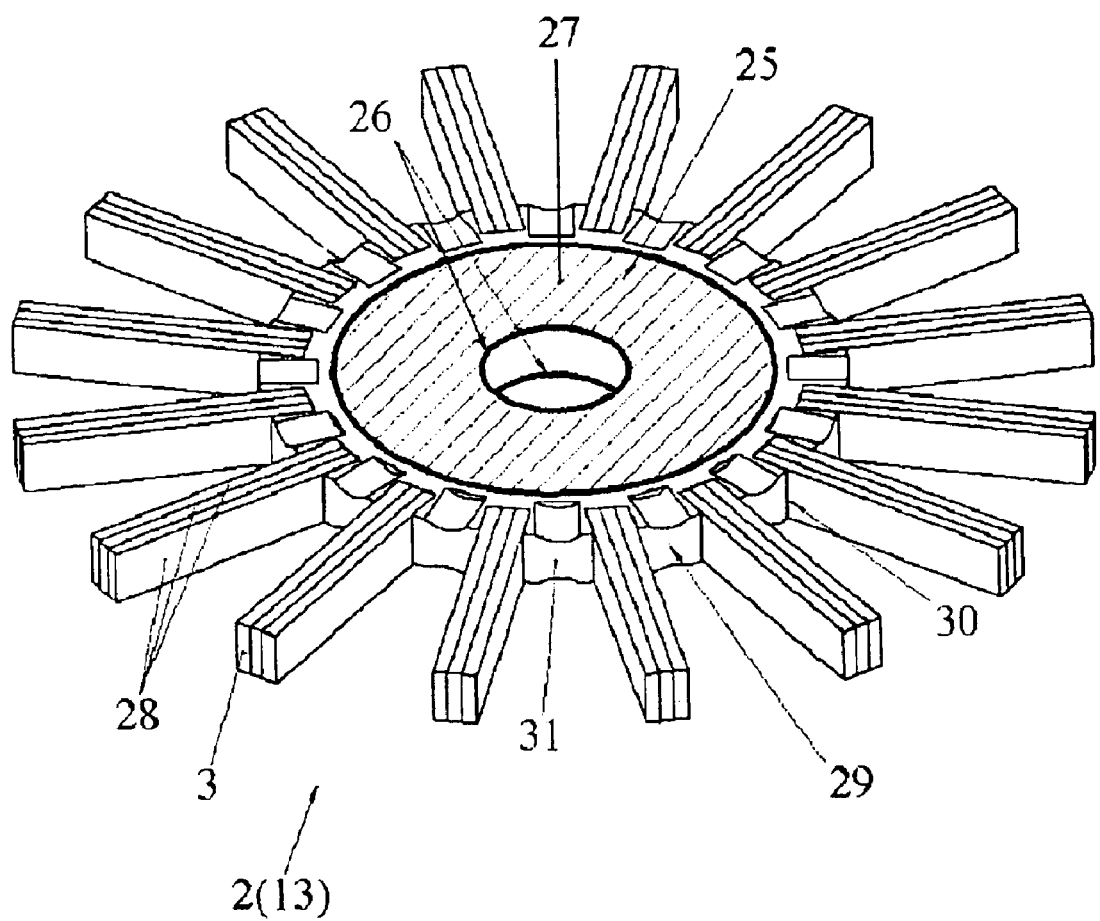
FIG. 5 is a view like that of FIG. 4 only with a modified form of pushers.
Figure 6:
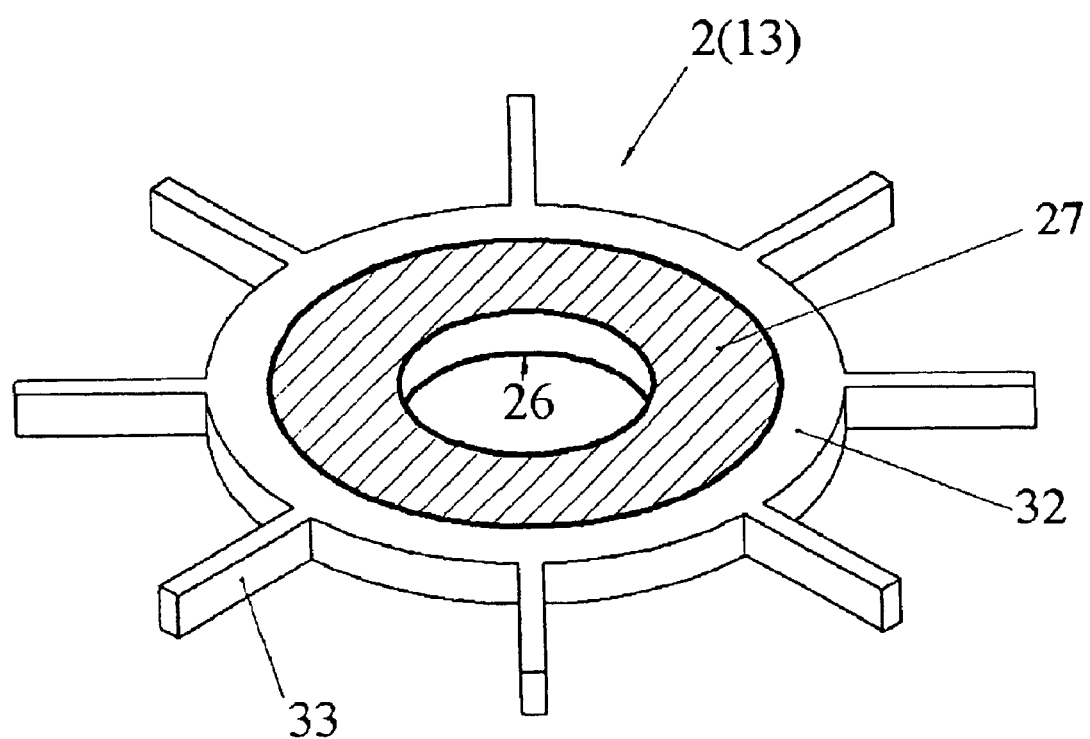
FIG. 6 is a view like that of FIG. 4 only with polymeric pushers according to the present invention.

FIGS. 4–6 illustrate some configurations that the piezoelectric oscillator(s) 2, 13 and pushers 3 of the drives of FIGS. 1 & 2 may have.

FIG. 4 shows a piezoelectric oscillator 2, 13 comprising a piezoelectric ring 21 that has been plated with a conductive surface, such as silver, copper, nickel, etc., on the radially internal and external surfaces thereof, to form annular conductive surfaces 22, 23. An electrical connection to excite the oscillator 2, 13 may be provided on any suitable part(s) of the conductive surfaces 22, 23, as is conventional. In the embodiment of FIG. 4 the pushers 3 may be made of any material having sufficient elastic and strength properties to serve as pushers (e.g. steel, as is conventional), and are bonded (e.g. soldered or glued) to the ring 21 at bonding areas 24.

In the embodiment of FIG. 5, the oscillator 2, 13 comprises a piezoelectric disc 25, with top and bottom conductive plated surfaces 26, 27, respectively. The pushers 3 are provided in groups. In the embodiment actually illustrated, three plates 28 form each of the pushers 3, although two, four, or more plates may be provided instead of three plates 28 in each group. A securing ring 29 secures the pushers 3 in the grooves 30 formed therein. The ring 29 may be made of metal, a suitable plastic, or any other material that can hold the pushers 3 in place and transfer ultrasonic energy from the disc 25 to the pushers 3. The ring 29 is rigidly connected to disc 25, e.g. by gluing, soldering, crimping, welding, or pressing. Similarly, the pushers 3 may be attached to ring 29 via grooves 30 by gluing, soldering, crimping, or pressing (into grooves 30). If crimping is used, it can be accomplished by crushing or deforming a part of the ring—as illustrated by deformed part 31 in FIG. 5—between the grooves 30. A conventional electrical connection from a source of power to the conductive plated surfaces 26, 27 may be made at any suitable location.

In the FIG. 6 embodiment, the oscillator 2, 13 may be made from a ring (like the ring 21) or a disc (like the disc 25). In either case, plated surfaces 22, 23 or 26, 27 are provided (the surfaces 26, 27 being shown in FIG. 6). In this embodiment, the pushers (33) are formed of polymeric material, according to the invention.

FIG. 6 shows a polymeric material ring 32 having polymeric pushers 33 integral therewith and radially extending therefrom. The ring 32 with pushers 33 may be injection molded, and then press fit or glued to the piezoelectric ring (21) or disc (25). Alternatively, the ring 32 and pushers 33 can be molded directly onto the piezoelectric ring or disk in a pressure mold.

Figure 7:
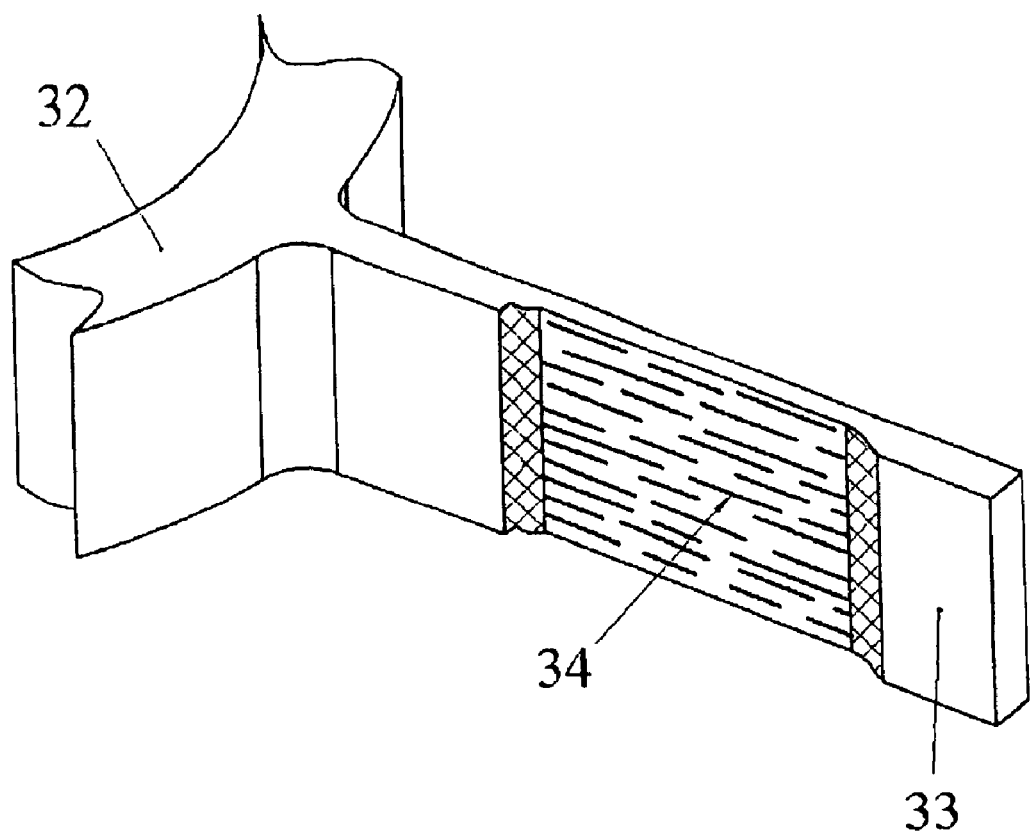
FIG. 7 is a top perspective schematic view, with portions cut away for clarity of illustration of an aspect thereof, of an exemplary form of polymeric pusher according to the present invention.

The ring 32 and integral pushers 33 are preferably made from the same material as described above with respect to the rotors 4, 11, for example semi-crystalline thermoplastic polymer (e.g. 30–60% polyarylamide. preferably about 45%), with filler (e.g. 40–70% glass particles or fibers, metal particles or fibers, etc., preferably about 55%). In order to increase the elastic properties and bending strength of the pushers 33, they can include oriented fibers, as shown at 34 in FIG. 7. The orientation of the fibers 34 may be accomplished using any conventional technique for that purpose, and at least 10% (and up to about 60%) of the total mass of the pushers 33, and preferably more than 50% of the filler for the polymeric material forming the pushers 33, are oriented within a few degrees of the direction of elongation of the pushers 33, as schematically illustrated in FIG. 7. The fibers 34 may be steel or other metal, fiberglass, oxide ceramic, graphite, or similar materials, as long as they improve the elastic and bending strength properties of the pushers 33.

The construction of FIGS. 6 and/or 7 has significant advantages compared with conventional constructions of pushers. The configuration 32, 33 allows a marginal increase in output power of the oscillator 2, 13, and a dramatic decrease in manufacturing cost. Also, life expectancy of the drive with which the configuration 32, 33 is associated is greatly increased, and the use of polymeric pushers 33 reduces noise emitted by the drive.

Figure 8:
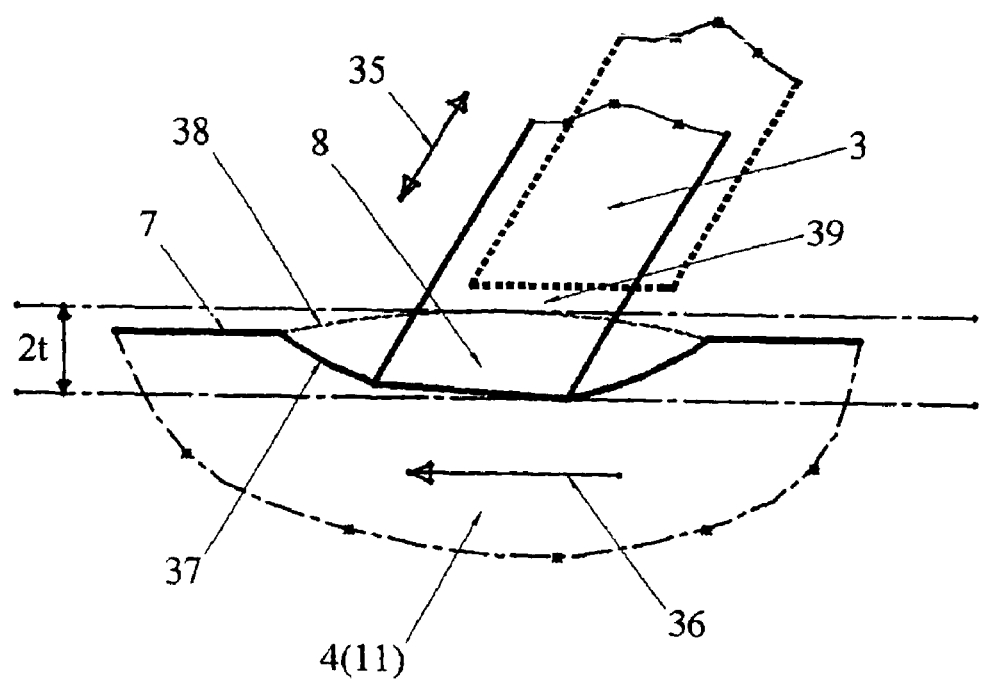
FIG. 8 is an enlarged, schematic, side view of the area of contact between a pusher and rotor according to the present invention.

FIG. 8 schematically illustrates the frictional engagement/interaction between the free ends 8 of the pushers 3 (or 33) and the rotor 4, 11 friction surface 7. As a pusher 3 is extended by the piezoelectric oscillator 2, 13, the free end 8 thereof moves in the dimension of arrows 35 (from the dotted line position in FIG. 8) into contact with the friction surface 7, causing indentation thereof (solid line in FIG. 8) and thus rotation of the rotor 4, 11 and pushers 3 with respect to each other in the direction of arrow 36. The indentation is schematically illustrated by line 37. The dotted line 38 shows the rebound of the surface 7 when the pusher 3 moves back to its dotted line position. The clearance 39 is provided between the end 8 of pusher 3 and the surface 7 after oscillation caused by oscillator 2, 13 has settled. The indentation and rebounding movements of surface 7 each have an amplitude "t", the total amplitude of movement being 2t, as seen in FIG. 8. The speed of rebound after indentation depends upon the mechanical properties of the material used for the friction surface 7 of the rotor 4, 11, a low Q factor being desirable.

While the pusher and rotor friction surface rebound to dotted line positions in FIG. 8 during operation, in the steady-state condition (when the piezoelectric oscillators 2, 13 are not energized), there is frictional contact between the pusher ends 8 and the rotor friction surface 7 (that is, the pushers 3; may be considered "jammed" onto the friction surface 7).

The amplitude "t" determines the power released at the point of frictional contact between the pusher free end 8 and the friction surface 7 of the rotor 4, 11, The higher the amplitude t, the lower the force of frictional impact. A reduced force reduces wear on the pusher end 8 and surface 7, thereby increasing life. Because the surface 7 is made of polymeric material, with a low Q factor, according to the invention, the indentation and rebound have no resonant nature, and occur only in the region of the end 8 of pusher 3 (enhanced even more if the pusher 33, of polymeric material, is provided as is preferred according to the invention). The polymeric material limits the amplitude t within the limits of the effective work of frictional contact, so that the energy release in the area of frictional contact is distributed from the surface 7 deep into the rotor 4, 11, and therefore does not cause destruction of the pusher ends 8 or the surface 7.

Figure 9:
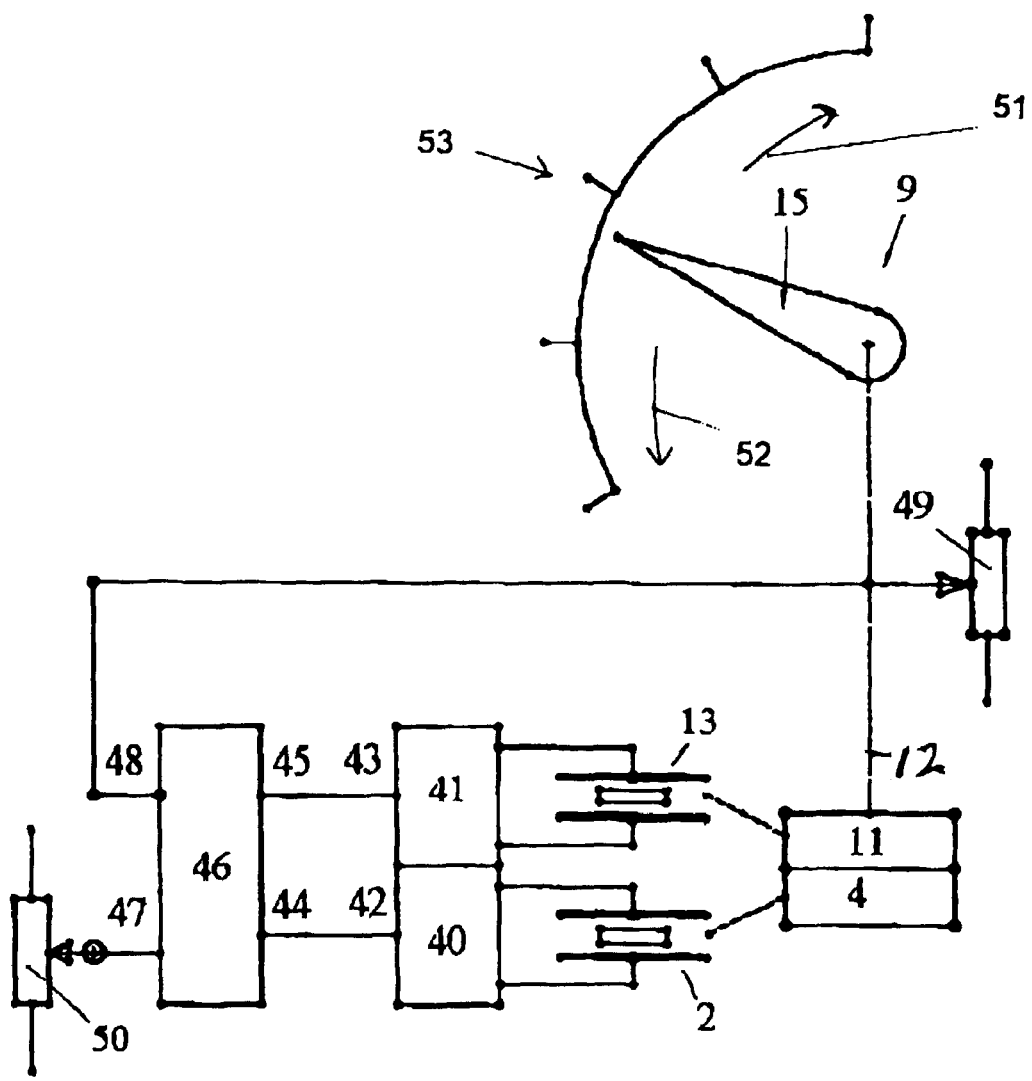
FIG. 9 is a schematic view of an exemplary analog instrument according to the present invention, using the bi-directional piezoelectric drive of FIG. 2.

FIG. 9 schematically illustrates an analog instrument (e.g. thermometer, barometer, speedometer, altimeter, anemometer, pH meter, etc.) that can be constructed according to the present invention, using the rotors 4, 11, and piezoelectric oscillators 2, 13, of FIG. 2. A resonance signal generator 40, 41, respectively, is connected to the plated surfaces (22, 23 or 26, 27) of each of the oscillators 2, 13, respectively. Each signal generator 40, 41 has a control input 42, 43, respectively, which is operatively connected to an output 44, 45, respectively of a control device 46. The control device 46, which may be a computer controlled power supply, or any other suitable control, has a reference input 47, and an information input 48.

A pointer 15 is mounted on the shaft 12 and operatively connected to the first and second rotors 4, 11 (e.g. as shown in FIG. 2 and described with respect thereto). An angular position sensor 49 is provided which operatively senses the position of the shaft 12, and the information input 48 is operatively connected to position sensor 49. An environmental condition sensor 50 is operatively connected to the angular position sensor 49, and operatively connected to the piezoelectric oscillators 2, 13, to control operation thereof to move the shaft 12 and pointer 15 in the first direction 51 (clockwise), or the second direction 52 (counterclockwise), with respect to a scale 53 in response to a sensed environmental condition.

The angular position sensor 49 may be a potentiometer, gear, magnetic wheel with a coil, Hall effect transducer, optical raster, or any similar device. The sensor 50 may sense any one (or more) environmental condition(s), such as atmospheric pressure, wind velocity, temperature, solar radiation, weight, radioactive decay, moisture, water depth, speed, altitude, pH, salinity, etc., and may be provided as a probe, surface-mounted device, load cell, or in any other conventional configuration.

Without the sensors 49, 50 (or with the sensor 49 for servo systems, or like precision uses), the system of FIG. 9 can be used for non-instrument devices. The shaft 12 (or the shaft 5 for the FIG. 1 embodiment) can be connected to a gear, micro-pump, point of purchase display, or any other suitable executive device. Also, two of the units of FIG. 1 can be mounted together with concentric shafts 5 (one within the other) to run a timing instrument, such as a clock (including hour and minute hands, or with three units also a second hand) or other timing device. Also, instead of using a pointer 15, the shaft 12 may be mounted to a conventional display device that creates a digital display that corresponds to the position of a pointer 15.

Figure 10:
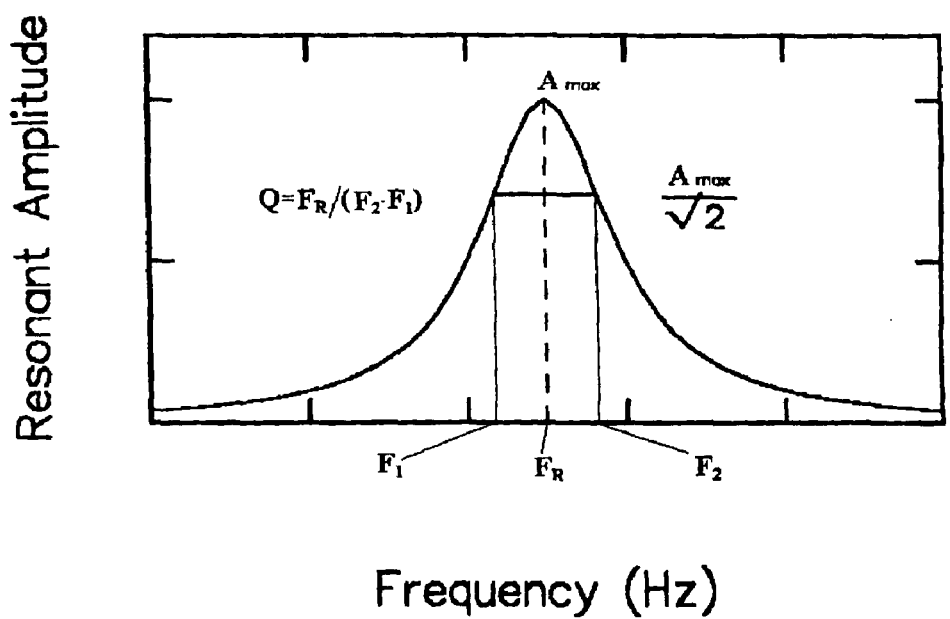
FIG. 10 is a resonance characteristic diagram, graphically illustrating the determination of an exemplary mechanical quality factor Q.

FIG. 10 is a resonance characteristic diagram, graphically illustrating the determination of an exemplary mechanical quality factor 0. As seen in FIG. 10, the factor Q=Fr/(F1-F2). Fr is the frequency (in Hz) of the resonant system at the maximum resonant amplitude Amax thereof. F1 and F2 are the frequencies at the points before and after the maximum amplitude determined by Amax divided by the square root of two.

An exemplary operation of an analog instrument according to the invention will now be described, with particular reference to FIGS. 2, 6, 8 & 9, it being understood that operation of other devices and embodiments will be slightly different, but similar.

In response to a sensed environmental condition (e.g. temperature), the sensor 50 generates a reference input signal at 47 to the control device 46. The device 46 then controls either the adjustable source of reference voltage 40 or 41 depending upon whether the pointer 15 is to be rotated clockwise 51 (to indicate increasing temperature) or counterclockwise 52 (for decreasing temperature). For example electric current is supplied through plated surfaces 26, 27 of oscillator 2 by source 40 to cause all the pushers 3 (or 33) each to move from the dotted line position of FIG. 8 to the solid line position. This in turn causes the rotor 4 to rotate clockwise (in direction 36 in FIG. 8). This in turn causes the shaft 12 and pointer 15 to rotate in direction 51, indicating on scale 53 an increase in temperature. After the ultrasonic energy from the oscillator 2 terminates, the pushers 3 (or 33) and friction surface 7 return to the steady state condition. The angular position sensor 49 determines if the pointer 15 has moved the correct angular increment, and feeds this information back to unit 46 through input 48. If correction is necessary, the device 46 controls the devices 40, 41 to effect it.

When the sensor 50 senses a decrease in temperature, the units 41, 13 operate in the same way as described above with respect to FIG. 2 to rotate the shaft 12 counterclockwise, in turn causing the pointer 15 to move in direction 52 and indicating a decrease in temperature with respect to scale 53.

Because of the polymeric material used for the friction surface 7 of the rotors 4, 11, each rotor 4, 11 can be expected to have an effective life of more than about 6,000 hours of actual operation, e.g. about 7,000 hours. Where, as is preferred, the polymeric pushers 33 are also utilized, each unit can be expected to have an effective life of more than about 9,000 hours, e.g. about 10,000 hours. Also, operation of the units will be more precise, allowing higher accuracy. The costs of the units will also be less, especially if the friction surfaces of, or the entire rotors, 4, 11, are injection molded, and/or the rings 32 and pushers 33 are injection molded.

In the above description it is to be understood that all numerical representations are approximate, and all narrow ranges within a broad range are specifically included. For example a range of polymer of about 40–50% includes 40–43%, 42–49%, 44.5–50.1%, and all other specific ranges within the broad range.

While the invention has been herein shown and described in what is presently conceived to be the most practical and preferred embodiment thereof, it is to be understood that the invention is to be accorded the broadest interpretation of the appended claims consistent with the prior art, so as to encompass all equivalents.

What is claimed is:

1. A rotor for a piezoelectric drive, comprising:
    a rotor body of a first material, and having a friction surface of a second material different from said first material and comprising semi-crystalline thermoplastic polymer with filler, which does not lose a significant amount of strength or start to melt when exposed to ultrasonic fields typically used in piezoelectric drives, said body and friction surface configured and dimensioned to cooperate with a stator, pushers, and piezoelectric oscillator in a piezoelectric drive, with pushers operatively engaging said friction surface.

2. A rotor for a piezoelectric drive as recited in claim 1 wherein said friction surface has a mechanical quality factor of less than about 200, has an ultimate tensile strength of at least about 140 Mpa, and has an effective life of at least about 6000 hours of operation in a piezoelectric drive.

3. A rotor for a piezoelectric drive as recited in claim 1 wherein said body friction surface consists essentially of about 30–60% by weight semi-crystalline thermoplastic polymer and about 40–70% by weight filler.

4. A rotor for a piezoelectric drive as recited in claim 3 wherein said body is injection molded of a polymeric material less expensive than polyarylamide, and wherein said semi-crystalline thermoplastic polymer comprises polyarylamide, and wherein said filler is selected from the group consisting primarily of particles of glass, fiberglass, particles or fibers of oxide ceramics, metals, carbon, or graphite, and combinations thereof.

5. A rotor for a piezoelectric drive as recited in claim 1 wherein said body is of molded aluminum alloy, or a like material having high heat conductivity so as to serve as a heat sink.

6. An elastic pusher for a piezoelectric drive, comprising:
an elastic pusher body comprising semi-crystalline thermoplastic polymer with filler, which does not lose a significant amount of strength or start to melt when exposed to ultrasonic fields typically used in piezoelectric drives, said body configured and dimensioned to cooperate with a stator, rotor, and piezoelectric oscillator in a piezoelectric drive.

7. An elastic pusher as recited in claim 6 wherein said pusher body consists essentially of semi-crystalline thermoplastic polymer with filler, and has a Q factor of less than about 100.

8. An elastic pusher for a piezoelectric drive as recited in claim 6 wherein:
said pusher body consists essentially of about 30–60% by weight semi-crystalline thermoplastic polymer and about 40–70% by weight filler, and has an ultimate tensile strength of at least about 140 MPa.

9. An elastic pusher for a piezoelectric drive as recited in claim 6 wherein said pusher body is injection molded and elongated in a dimension, and comprises a polymer with at least 10% by weight fibers substantially oriented in the dimension of elongation of said pusher body.

10. An elastic pusher for a piezoelectric drive as recited in claim 6 wherein said body is of the same material as and integral with a ring and a plurality of other pushers all extending radially from said ring; and wherein said ring is dimensioned and configured to fit on or in a piezoelectric oscillator.

11. An elastic pusher for a piezoelectric drive as recited in claim 10 wherein said ring is press fit onto orinto, adhesively attached to, or molded onto or into, said piezoelectric oscillator.

12. An elastic pusher for a piezoelectric drive as recited in claim 6 having an effective life of at least about 9000 hours of operation in a piezoelectric drive when cooperating with a rotor body having a friction surface comprising semi-crystalline thermoplastic polymer with filler, which does not lose a significant amount of strength or start to melt when exposed to ultrasonic fields typically used in piezoelectric drives.

13. An elastic pusher for a piezoelectric drive as recited in claim 8 wherein said semi-crystalline thermoplastic polymer comprises polyarylamide.

14. An elastic pusher for a piezoelectric drive as recited in claim 6 wherein; said pusher body comprises a plurality of plates connected together, at least some of the plates having oriented fibers in the dimension of elongation thereof, and wherein said pusher is connected to a holder along with a plurality of like pushers, by crimping, adhesive, soldering, or welding.

15. A piezoelectric drive comprising:
a stator;
a first piezoelectric oscillator
a first rotor with a friction surface comprising semi-crystalline thermoplastic polymer with filler, which does not lose a significant amount of strength or start to melt when exposed to ultrasonic fields typically used in piezoelectric drives;
a driven element operatively connected to said first rotor; and
a plurality of elastic pushers cooperating between said first rotor friction surface and first oscillator, to move said driven element in a first direction with respect to said stator upon actuation of said piezoelectric oscillator, said pushers comprising semi-crystalline thermoplastic polymer with filler, which does not lose a significant amount of strength or start to melt when exposed to ultrasonic fields typically used in piezoelectric drives.

16. A piezoelectric drive as recited in claim 15 wherein the material of said pushers has a mechanical quality factor of less than about 100, and has an:
ultimate tensile strength of at least about 140 Mpa, and comprises about 30–60% semi-crystalline thermoplastic polymer and about 40–70% filler.

17. A piezoelectric drive as recited in claim 15 further comprising:
a second piezoelectric oscillator;
a second rotor with a friction surface;
a plurality of elastic pushers cooperating between said second rotor and second oscillator, to move said driven element with respect to said stator upon actuation of said second piezoelectric oscillator;
said rotors operatively connected so that actuation of said first and second piezoelectric oscillators, respectively, moves the driven element in opposite first and second directions; and
wherein said second rotor friction surface and said plurality of pushers, comprise semi-crystalline thermoplastic polymer with filler, which does not lose a significant amount of strength or start to melt when exposed to ultrasonic fields typically used in piezoelectric drives.

18. A piezoelectric drive as recited in claim 17 wherein said driven element is a shaft, and wherein said rotors are operatively connected to a pointer of an analog instrument, said pointer mounted on said shaft, which shaft is rotatable clockwise or counterclockwise.

19. A piezoelectric drive as recited in claim 18 further comprising an angular position sensor which operatively senses the position of said shaft, and an environmental condition sensor operatively connected to said angular position sensor, and operatively connected to said piezoelectric oscillators to control operation thereof to move said pointer clockwise or counterclockwise in response to a sensed environmental condition.

20. A piezoelectric drive as recited in claim 15 wherein said first rotor is operatively connected to a driven mechanical element excluding a pointer.

21. A piezoelectric drive as recited in claim 15 wherein said driven element includes a time measuring hand.

22. A piezoelectric drive as recited in claim 20 wherein said first rotor including said friction surface thereof is injection molded of about 30–60% by weight semi-crystalline thermoplastic polymer and about 40–70% by weight filler.

23. A rotor for a piezoelectric drive as recited in claim 22 wherein said semi-crystalline thermoplastic polymer comprises polyarylamide.

24. An instrument comprising:
a piezoelectric drive comprising: a first stator, a first piezoelectric oscillator, a first rotor, and a first plurality of elastic pushers cooperating between said first rotor and first oscillator; and a second piezoelectric oscillator, a second rotor, and a second plurality of elastic pushers cooperating between said second rotor and second piezoelectric oscillator;
a shaft operatively connected to said first and second rotors;
said rotors operatively connected so that actuation of said first and second piezoelectric oscillators, respectively, moves said shaft in opposite first and second directions; and
an environmental condition sensor operatively connected to said piezoelectric oscillators to control operation thereof to move said shaft in said first or second directions in response to a sensed environmental condition.

25. An instrument as recited in claim 24 comprising an analog instrument;
and further comprising a pointer mounted to said shaft for movement therewith, and a scale which said pointer moves relative to.

26. An analog instrument as recited in claim 25 further comprising an angular position sensor which operatively senses the position of said shaft and operatively connected to said environmental condition sensor.

27. An analog instrument as recited in claim 26 wherein said first and second rotors comprise bodies each having a friction surface of at least about 30% by weight semi-crystalline thermoplastic polymer with filler, and have an effective life of at least about 6000 hours of operation.

28. An instrument as recited in claim 24 wherein said pushers comprise about 30–60% by weight semi-crystalline thermoplastic polymer and about 40–70% by weight filler, and have an ultimate tensile strength of at least about 140 MPa.

* * * * *